Jan. 30, 1968 W. G. YOUNG 3,366,186
TRENCH DRILL
Filed Aug. 9, 1965 4 Sheets-Sheet 2
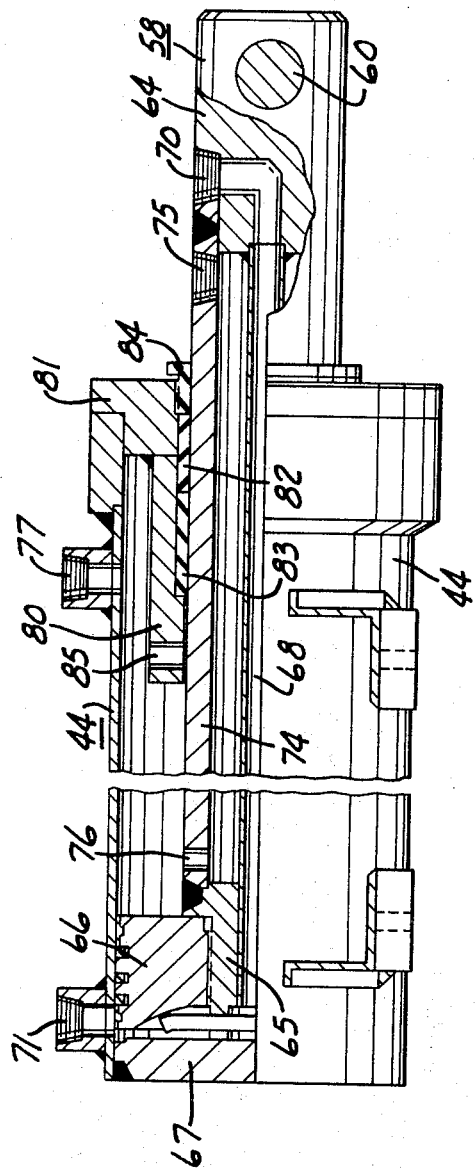
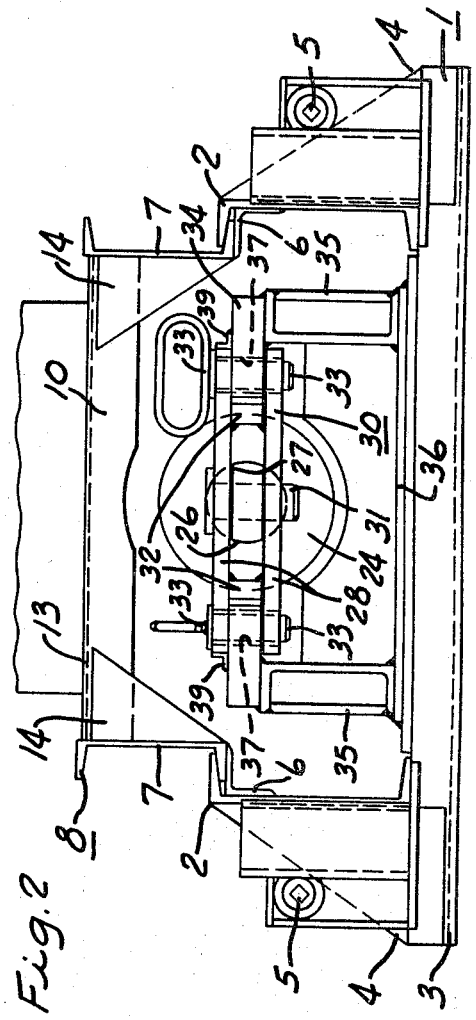
INVENTOR.
WILLIAM G. YOUNG
BY
CAROTHERS and CAROTHERS
His ATTORNEYS Jan. 30, 1968 W. G. YOUNG 3,366,186
TRENCH DRILL
Filed Aug. 9, 1965 4 Sheets-Sheet 3
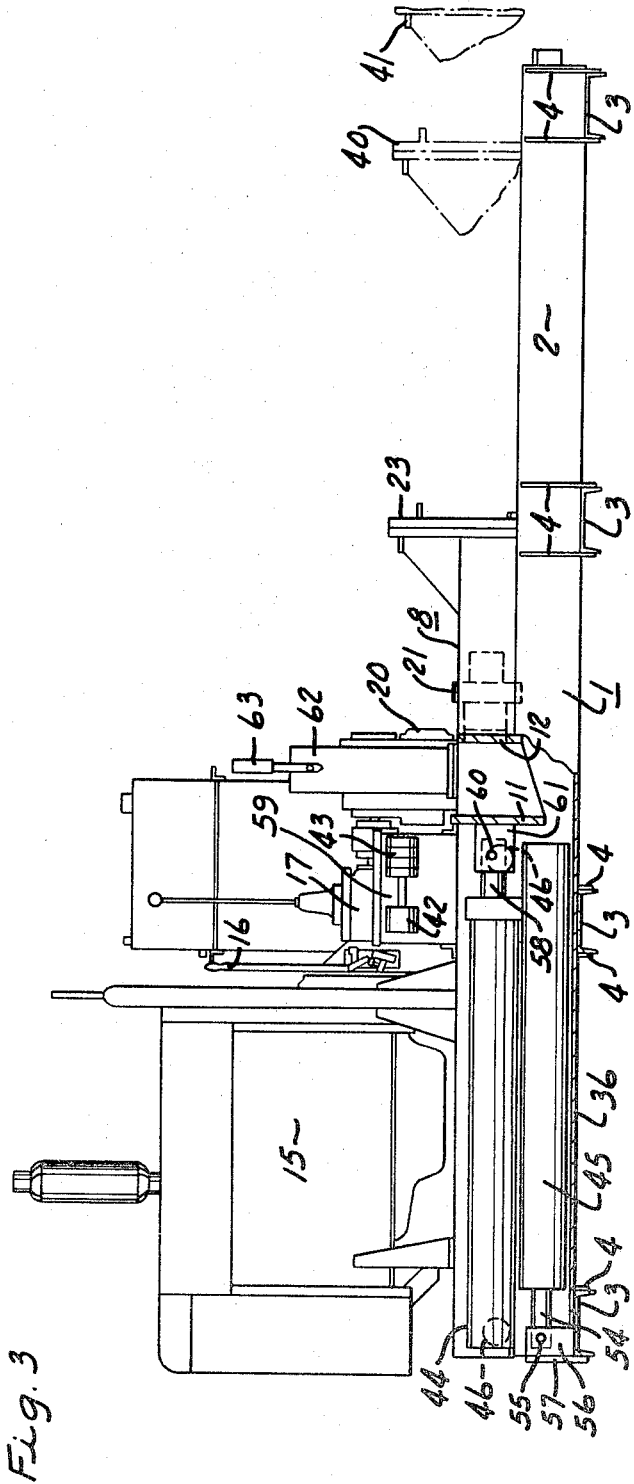
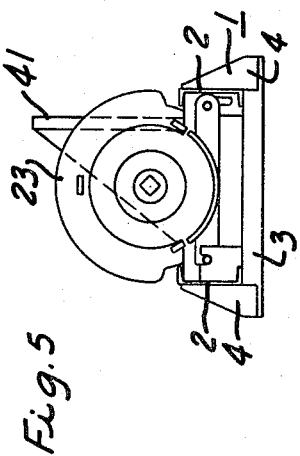
INVENTOR.
WILLIAM G. YOUNG
BY
CAROTHERS AND CAROTHERS
HIS ATTORNEYS

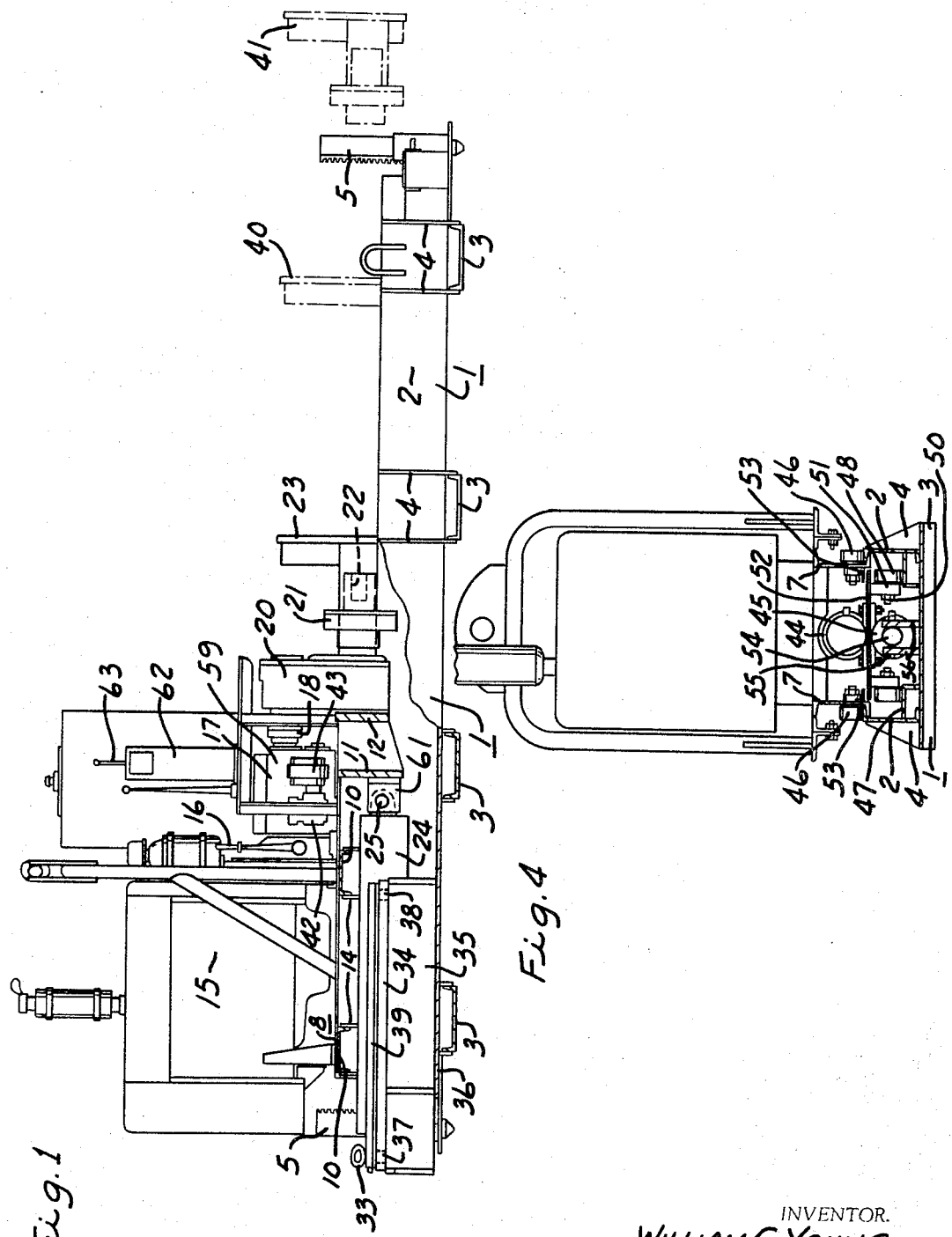

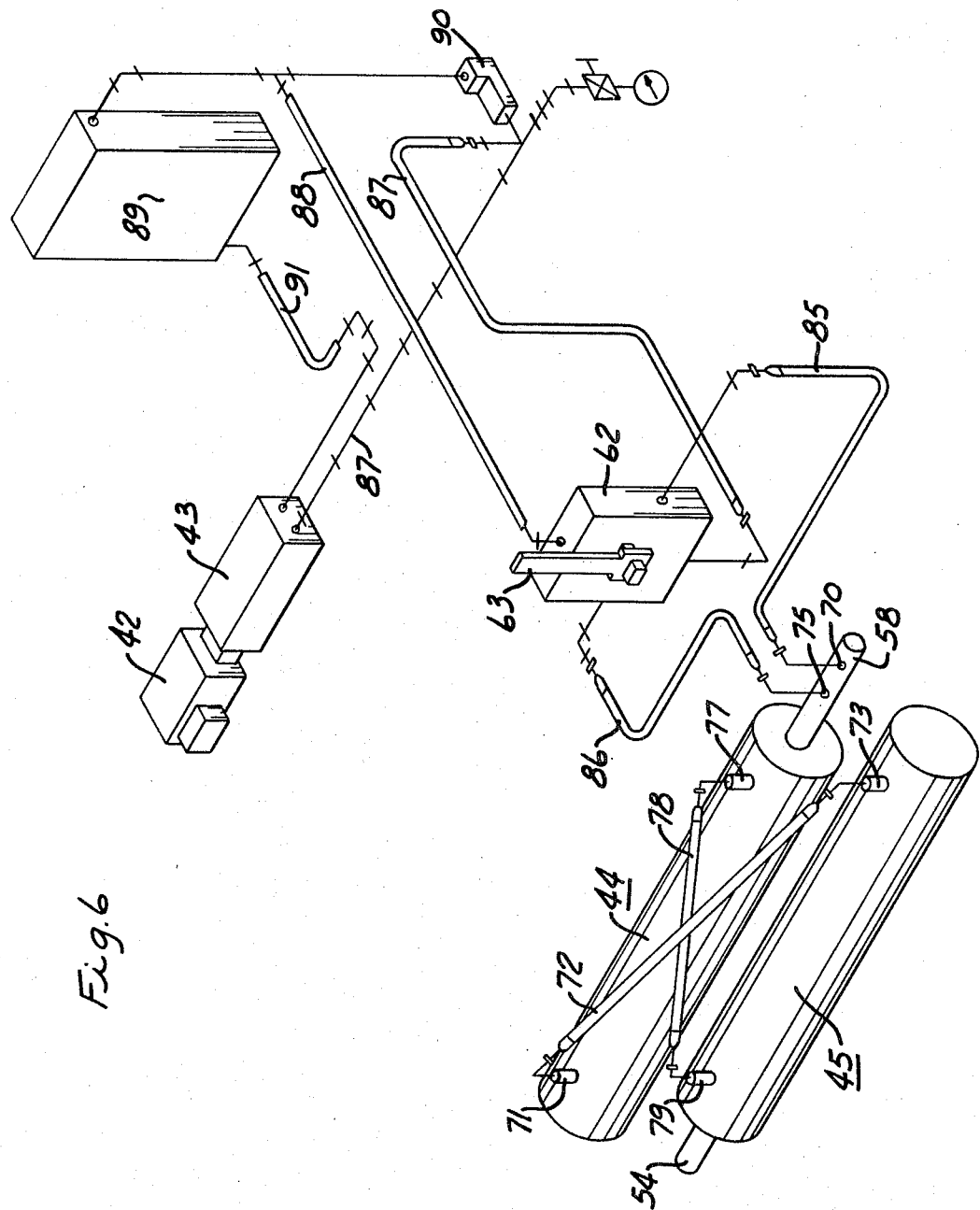

United States Patent Office 3,366,186
Patented Jan. 30, 1968

3,366,186
TRENCH DRILL
William G. Young, Salem, Ohio, assignor to The Salem Tool Company, Salem, Ohio, a corporation of Ohio
Filed Aug. 9, 1965, Ser. No. 478,310
2 Claims. (Cl. 173—31)

ABSTRACT OF THE DISCLOSURE

The trench drill comprising this invention provides the application of the fluid pressure for feeding the rotary drill in substantial axial alignment with the rotary drilling mechanism. The fluid pressure being provided by fluid pressure motor in the form of a single double-acting piston and cylinder and in another form by a pair of double-acting pistons operating in opposite directions from their respective cylinders secured together and wherein the piston rod connected to the carriage is provided with a dual passage connected to the opposite side of its piston and cross connections from the ends of the cylinder connected to the opposite ends of the second cylinder. Since the cylinders are secured together, the dual passages in the piston rod of the first cylinder thereby controls both fluid cylinders simultaneously without movable or extending connections.

---

This invention relates to trench drills wherein an open trench is usually required to receive an augering machine for drilling horizontal holes under railroads, highways and streets for pipe, conduits and cables.

This work presents new and different problems. The demand for larger holes, larger pipe, conduit or even culverts demands different equipment and interchangeability of different diameters of augers. As the word implies, a trench is necessary in order to drill the hole at the specified depth below the roadway. It is desirable to limit the length of the trench because it is frequently between roadways and between buildings and there is not sufficient room to have a long trench drill yet it must be large enough to drill a sufficient hole and for the placement of the conduit pipe, tube or culvert.

The principal object of this invention is the provision of a trench drill having limited operating length for drilling and inserting a conduit. In this disclosure there are two trench drills having different structures and both of which have an overall operating range of seventeen feet including the motor or the carriage carried on the track.

In one structure a single double-acting cylinder and piston is extended from two positions to gain the full working length of seventeen feet. The piston rod is pivotally attached to a special double H crosshead slidable on a high independent track in line with the axis of the cylinder that is pivoted to the underside of the carriage but is also in substantial axial alignment with the rotary axis of the auger.

In the other structure two double-acting cylinders and pistons have their cylinders with their fluid supply ends cross connected and mechanically secured to each other to be slidable independently along the track and their piston rods, one pivotally connected to the track and the other pivotally connected to the carriage which supports the motor means operating the pistons and rotating the auger mechanism. The cylinders are expanded and contracted through connections in one piston rod that has dual lines connected to the opposite sides of its piston. With the cylinder ends cross connected, only two lines to one piston rod are necessary since both cylinders are connected in parallel. Thus with two feed cylinders operating in parallel have their expanded lengths added to one another to gain the same full working length of seventeen feet.

These two structures thus provide improved advantages in trench drills that have not hereto been available and they provide a novel and useful advance in the art.

Another object of this invention resides in the parallel cross connection of two cylinders secured to each other and controlled through a double ported piston rod from a stationary point to effectively add the lengths of their piston strokes.

Other objects and advantages appear hereinafter in the following description and claims.

The accompanying drawings show for the purpose of exemplification without limiting the invention or claims thereto, certain practical embodiments illustrating the principles of this invention wherein:

FIG. 1 is a side elevation with parts broken away and in section illustrating one form of the trench drill comprising this invention.

FIG. 2 is an end elevation of the track as shown in FIG. 1.

FIG. 3 is a side elevation with parts broken away and in section illustrating another form of the trench drill comprising this invention.

FIG. 4 is an end view of the structure shown in FIG. 3 with parts broken away and shown in section.

FIG. 5 is a view in front elevation of the pusher adapter.

FIG. 6 is a schematic view of the dual fluid feed cylinders and the fluid system for operating the same.

FIG. 7 is a sectional view of one of the fluid actuating cylinders shown in FIG. 6.

Referring to FIGS. 1 and 2 the trench drill comprises the base track 1 made with the opposed longitudinal inturned channel members 2 connected by the transverse channel members 3 and laterally supported by the gusset plates 4 and having secured in quadrangular relation each of the four lift jacks 5.

The opposed inturned channel members 2 are provided with the inturned angle irons 6 that extend for the full length of the base to support the bottom flange outwardly projecting carriage channel members 7 of the carriage 8. The base of the carriage 8 includes the channel members 7 and the cross channel members 10 together with the transverse parallel breast plates 11 and 12 all of which depend under the deck 13 of the carriage which is additionally braced by the gusset plates 14 extending between the deck 13 and the inner face of the channel 7 and the sides of the transverse channels 10.

It will be noted that the bottom of the flange of the channel 7 rests on the upper surface of the angle member 6 and under the inturned flanges of the base channels 2. Thus, the carriage 8 is enabled to move between these guides which are preferably greased to provide uniform movement along this base track.

On the deck of the carriage 8 the engine 15 is supported in a manner so that it overhangs the rear end of the carriage. This engine is preferably a diesel engine and is provided with an operating clutch as indicated by the operating handle 16 which connects the rotary drive to the transmission 17 that drives the exterior coupling 18 on the back of the gear case 20 which further reduces the rotary drive and the output extends forwardly from the gear case to the auger coupling 21. The gear case 20 lies in front of and is supported by the forward breast plate 12.

The auger coupling with its square socket indicated at 22 lies behind the semi-circular pusher plate 23 which is employed to engage the pipe or conduit to force the same inwardly in the hole immediately behind the cutting head. Such pipe or conduit contains the augering flights by which the material mined or dug is withdrawn out of the hole as the carriage is moved forwardly while rotating and advancing the auger head to bore the opening. The forward movement of the carriage is produced by the fluid actuating cylinder 24 having its cylinder pivotally connected by the pin 25 to the rear breast plate 11. The opposite end of the cylinder has the piston rod 26 extending rearwardly therefrom and is flattened at its rear end indicated at 27 to extend between the upper and lower plates 28 of the cross head 30 and through which there are aligned openings to receive the piston rod pin 31. Thus, the opposite ends of the fluid cylinder and rod are pivotally connected between the carriage 8 and the cross head 30.

The plates 28 of the cross head 30 are secured to each other by the bars 32 which are spaced materially from the ends of the cross head to allow ample room for the aligned holes to receive the locking pins 33 which are provided with handles to permit them to be readily withdrawn. The aligned holes in the upper and lower plates of the cross head 30 are permitted to match with two sets of holes in the inturned track members 34 mounted on the box frames 35 supported from the plate 36 on the transverse channel members 3. The rails 34 and the box members 35 extend from a point to the rear of the track 1 to a point behind the front pivot pin 25 of the cylinder 24. The carriage 8 is in its retracted position as shown in FIG. 1. The track members 34 also have upstanding guide rails 39 for the cross head 30.

As shown in FIGS. 1 and 2, and, as previously stated, the inturned track members 34 are provided with two sides of holes 37 and 38. The holes 37 are at the rear end of the track and the holes 38 are at the forward end of the track. The distances between the two sets of holes 37 and 38 that receive the locking pins 33 is made substantially equal to that of the full extended movement of the piston within the double-acting cylinder 24. This provides a two stage operation for the movement of the carriage from the position as shown in full lines in FIG. 1 to the position indicated at 40 which is the mid position along the track 1 between the pusher plate 23 as shown in full lines and the extreme position shown in dotted lines at 41. The length between the mid position 40 and the extreme position at 41 represents in distance substantially the full extension of the piston within the fluid cylinder 24. Thus, in carrying out the two stage operation the boring proceeds from the position 23 shown in full lines until the pusher plate reaches the point 40 at which time the pins 33 are withdrawn from the holes 37 and the double acting cylinder 24 draws the cross head 30 up the track member 34 to the position of the second set of holes 38 at which time the locking pins 33 are again dropped in the holes 38 to permit the carriage to proceed from the position 40 to the position 41. The back stroke when used to completely withdraw the auger sections and cutting head or to uncouple and merely retract to receive an additional auger section, will be returned in the same manner of two stages to bring the carriage from the position 41 to the position 40 wherein the locking pins 33 will be again withdrawn from the holes 38 and the cylinder will be energized to extend the piston and piston rod rearwardly to move the cross head 33 to the position wherein the locking pins 33 may again be inserted in the set of holes 37.

In this position as shown in FIG. 1 an additional auger section may be placed in the string or if the auger string is being removed the then exposed auger section will be removed from the auger assembly.

A power take off indicated at 42 on the side of the transmission 17 is employed to operate the pump 43 which is a hydraulic pump connected to operate the piston within the double-acting cylinder 24. As indicated the overall working length of this trench drill between the point 41 and the rear of the engine 15 on the carriage 8 is substantially seventeen feet. This makes the distance between the full line position of the pushed plate 23 and the point 40 approximately four feet which is the same distance between the points 40 and 41. Thus, in its fully retracted position, an eight foot auger section could be employed in the auger mining mechanism when utilizing the two stage fluid motor operation.

Referring now to FIGS. 3 to 7, the two stages of operation are obtained through the use of two double-acting cylinders 44 and 45 which as shown are connected together. These cylinders may be ported so that cylinder 44 will always function first but it is preferable to port them equally so that they operate in unison in order to effect the two complete stages of their expansion. Even though ported uniformly in actual practice, one cylinder will frequently take the lead in expanding or contracting; and depending upon the conditions sometime there is reversal in which a cylinder takes the lead in movement. In any event, two stages of movement are effected by the use of two cylinders even though one does not have to stop at the center point of the cylinders 44 and 45.

Referring specifically to FIGS. 3 and 4 the track 1 is substantially the same being provided with inturned channel members 2 supported on transverse channels 3 braced by the gusset plates 4. The carriage 8 with its outwardly projecting channels 7 has its lower flange projecting under the upper flange of the track channel members 2 and rather than employ the sliding engagement with the track, the carriage 8 is provided with the rollers 46 of which there are 4 in number for movability supporting the carriage as it travels along the track 1. The undertrack is somewhat different as shown in FIG. 4 wherein the box structure 47 is connected between the inturned flanges 2 and the transverse channels 3 to support the rollers 48 that are supported on the inwardly projecting shafts 50 that pass through holes in the depending arms 51. There are four rollers 48 secured to and depending from the plate 52 to support the two double-acting cylinders 44 and 45. As shown the cylinders 44 and 45 are bolted together and to the carriage plate 52 the rollers 48 of which ride on the top of the rails 47 forming the undertrack. Angle guides 53 are secured to the inside of the channel members 7 to prevent the rolls 48 from rising off the rails 47. Lateral movement of the carriage plate 52 is prevented by the piston rods extending in opposite directions from the cylinders 44 and 45.

The piston rod 54 extending from the cylinder 45 is pinned as indicated by the pin member 55 to the spaced plates 56 that are welded not only to the transverse channel 3 but also to the rear breast plate 57 which represents the track connection of the two-stage double-acting cylinders 44 and 45. The piston rod 58 extending forwardly from the cylinder 44 is pinned as indicated at 60 between the parallel plates 61 that are secured to the rear breast plate 11 which is, in turn, connected to the forward breast plate 12 in a similar manner as previously shown. The power takeoff and pump as shown at 42 and 43 are contained within the enclosure 59. In this case the motor 15 is provided with the transmission 17, is likewise provided with a clutch handle 16 which is also shown in the previously described trench drill.

A single control valve 62 that operates handle 63 is used as shown in FIGS. 1 and 3 to actuate the fluid cylinder which structure is more clearly shown in FIGS. 6 and 7.

FIG. 7 shows the sectional view of the cylinder 44 and, of course, both fluid cylinders could be the same in which case the connections between the cylinder rod of the cylinder 45 would be plugged. As shown the cylinder 44 with its rod 58 and pin 60 is hollow and is actually constructed by two heads, head 64 at the rod end and head 65 at the piston end, the piston being indicated at 66 and being at its extreme position adjacent the cylinder head 67 of the cylinders 44. The rod 58 is made of two concentric and coaxial tubes. The inner tube 68 is set within bores in the heads 64 and 65 and form the port 70 connected therewith thus connects fluid at the opposite end of piston 66 from whence it may travel from the port 71 to the line 72 to the port 73 of the cylinder 45.

The outer concentric tube 74 is secured at one end to the head 64 and to the opposite end of the head 65 and this tube has its inner space connected to the port 75 and its opposite end is provided with a port 76 adjacent the piston head 66 and on this side of the cylinder head is ported at 77 from whence as shown in FIG. 6 the port 77 is connected in the line 78 to the port 79 in the cylinder 45. Thus, the ports 73 and 79 on the cylinder 45 are positioned on separate sides of its piston connected to its piston rod 54.

The cylindrical sealing sleeve 80 encircles the piston rod 58 within the cylinder 44 opposite the port 77. This sleeve together with the cap 81 which are welded together to form a unitary part and is provided with the packing as indicated at 82 which is backed up by the ring 83 together with the gland member 84 for sealing the reciprocating piston rod 58. Radial ports 85 may be connected between the clearance bore of the tube 80 and the exterior space around the tube 80 to avoid turbulence as the chamber increases or decreases. The ports 70 and 75 are connected as shown in FIG. 6 as indicated in the lines 85 and 86 to the control valve 62 which is supplied through the line 87 from the pump 43 and the discharge line 88 from the control valve 62 extends back to the supply tank 89. A relief valve 90 is connected between the lines 87 and 88 and an inlet line 91 is connected from the tank 89 to the pump 43 as shown in FIG. 6 and thereby completing the fluid circuit. With this dual double acting fluid cylinder motor, one is enabled to separate the same through two stages and a very short coupling in the lines 85 and 86 are required between the control valve 62 and the ports 70 and 75 of the piston rod 58.

As shown in FIG. 3 the forward end of the track 1 to the point 23 is just a little longer than the four foot stroke. However, the extension of the carriage to the front wheel 46 that supports the same will position the pusher plate 23 upon the full extension of one of the fluid actuating cylinders 44 and 45 to the position 40. The overhanging extension of the forward part of the carriage 8 will extend the pusher plate 23 to the point 41 upon the full extension of the second of the double-acting fluid cylinders 44 and 45. This shows the advantage of employing wheels 46 to support the carriage rather than the slide arrangement shown in FIGS. 1 and 2 in that the track frame may be made a foot or so shorter. The wheel support obviously has other advantages but in some installations it may be found preferable to have the slide support of the carriages as illustrated in FIGS. 1 and 2 as against the rollers support of the carriage as illustrated in FIG. 3. Slide support or guidance may be necessary in order to aid in the elimination of any galling side action which may develop due to the heavy load that may be encountered and from the heavy thrust that may be supplied.

I claim:

1. A trench drill including a track guiding a carriage therealong and carrying a rotary augering assembly driven by a motor means on said carriage and a power feed to move the carriage back and forth by double-acting fluid motor means supplied with fluid under pressure by said motor means and connected between said carriage and said track, said double-acting fluid motor means includes a cylinder with a piston and rod, said fluid motor means connection with said track includes a crosshead having upper and lower plates joined by spaced bars forming outwardly open grooves, inwardly projecting rails on said track substantially filling said grooves to guide said crosshead, pivot means to attach said rod to said crosshead plates between said bars, and pin means passing transversely through the plates of each groove and said rails to interlock said crosshead and rails in at least two positions and in substantial alignment with said rotary auger assembly to be effective through two stages to provide said predetermined working length.

2. A trench drill including a track guiding a carriage therealong and carrying a rotary augering assembly driven by a motor means on said carriage and a power feed to move the carriage back and forth by double-acting fluid motor means supplied with fluid under pressure by said motor means and connected between said carriage and said track, said double-acting fluid motor means includes two fluid cylinders fastened together and with their piston rods extending from their pistons in opposite directions and attached respectively to said track and carriage with at least one connected substantially in alignment with said rotary auger assembly, the piston rod attached to said carriage having a dual passage therethrough to connect the opposite sides of its piston, and cross connections between the opposite ends of said cylinders to place them in parallel to be effective through the stages of each cylinder to provide said predetermined working length.

References Cited

UNITED STATES PATENTS

| 2,394,194 | 2/1946 | McCarthy | 173—154 |
| 3,118,509 | 1/1964 | Adams et al. | 173—62 |
| 3,162,254 | 12/1964 | Rose | 173—148 |
| 3,232,360 | 2/1966 | Dickinson | 175—62 |

FRED C. MATTERN, Jr., *Primary Examiner.*

L. P. KESSLER, *Assistant Examiner.*